(12) United States Patent
Umetsu

(10) Patent No.: US 8,786,648 B1
(45) Date of Patent: Jul. 22, 2014

(54) IMAGE ERASING APPARATUS

(71) Applicants: Kabushiki Kaisha Toshiba, Tokyo (JP); Toshiba Tec Kabushiki Kaisha, Tokyo (JP)

(72) Inventor: Toshiyuki Umetsu, Shizuoka-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/014,083

(22) Filed: Aug. 29, 2013

(51) Int. Cl.
*B41M 7/00* (2006.01)

(52) U.S. Cl.
CPC ............ *B41M 7/00* (2013.01); *B41M 7/0009* (2013.01)
USPC ............................................. 347/179

(58) Field of Classification Search
USPC ................................................ 347/171, 179
See application file for complete search history.

(56) References Cited

U.S. PATENT DOCUMENTS

| | | | | |
|---|---|---|---|---|
| 2012/0257264 A1* | 10/2012 | Megawa | ......................... | 358/505 |
| 2013/0016375 A1 | 1/2013 | Hashidume | | |
| 2013/0016376 A1 | 1/2013 | Hashidume | | |
| 2013/0156458 A1* | 6/2013 | Suzuki | ............................ | 399/81 |
| 2014/0055545 A1* | 2/2014 | Fukaya | ......................... | 347/179 |

FOREIGN PATENT DOCUMENTS

JP    2005-138572    *    6/2005    ............... B41J 29/26

* cited by examiner

*Primary Examiner* — Huan Tran
(74) *Attorney, Agent, or Firm* — Patterson & Sheridan, LLP.

(57) ABSTRACT

An image erasing apparatus includes an erasing unit, a reading unit, and a control unit. The erasing unit erases an image formed in a recording medium. The reading unit reads control information included in the image. The control unit determines whether or not to erase the image using the erasing unit on the basis of date information included in the control information.

10 Claims, 6 Drawing Sheets

IMAGE ERASING APPARATUS

CROSS-REFERENCE TO RELATED APPLICATION

This application is based upon and claims the benefit of priority from the prior Japanese Patent Application No. 2013-7709, filed on Jan. 18, 2013, the entire contents of which are incorporated herein by reference.

FIELD

Embodiments described herein relate generally to an image erasing apparatus that determines whether or not to erase an erasable image printed on a recording medium.

BACKGROUND

In recent years, an image forming apparatus that prints an image (hereinafter, referred to as an erasable image), such as a character or a picture, on a recording medium, for example, on a sheet using an erasable color material has been proposed. In addition, an image erasing apparatus that erases an erasable image printed on a sheet has been proposed. A user can reuse a single sheet multiple times by repeating forming an erasable image on the sheet and erasing the erasable image on the sheet. Therefore, it is possible to contribute to resource saving by using the above apparatuses.

Repeating the cycle of the image formation and the image erasing is based on the assumption of the erasing of an image printed on the sheet. When erasing an erasable image, it is generally thought that erasable images printed in advance on a plurality of sheets are erased at a time. When erasing the images on the plurality of sheets at a time, it is efficient to set the plurality of sheets in a paper feed unit of the image erasing apparatus and execute erasing processing automatically by turning on an erase start switch.

On the other hand, in document management (management of a sheet on which an image is printed), there is a management method in which an image printed on the sheet cannot be erased unless a predetermined storage period has passed even if the image is erasable. In this management method, a case may be considered in which a sheet within the storage period is accidentally included in a large amount of sheets to be erased.

However, it is not practical to check the image content of each of the large amount of sheets to be erased, and to determine whether or not each sheet is a sheet within the storage period.

DETAILED DESCRIPTION

Figure 1:
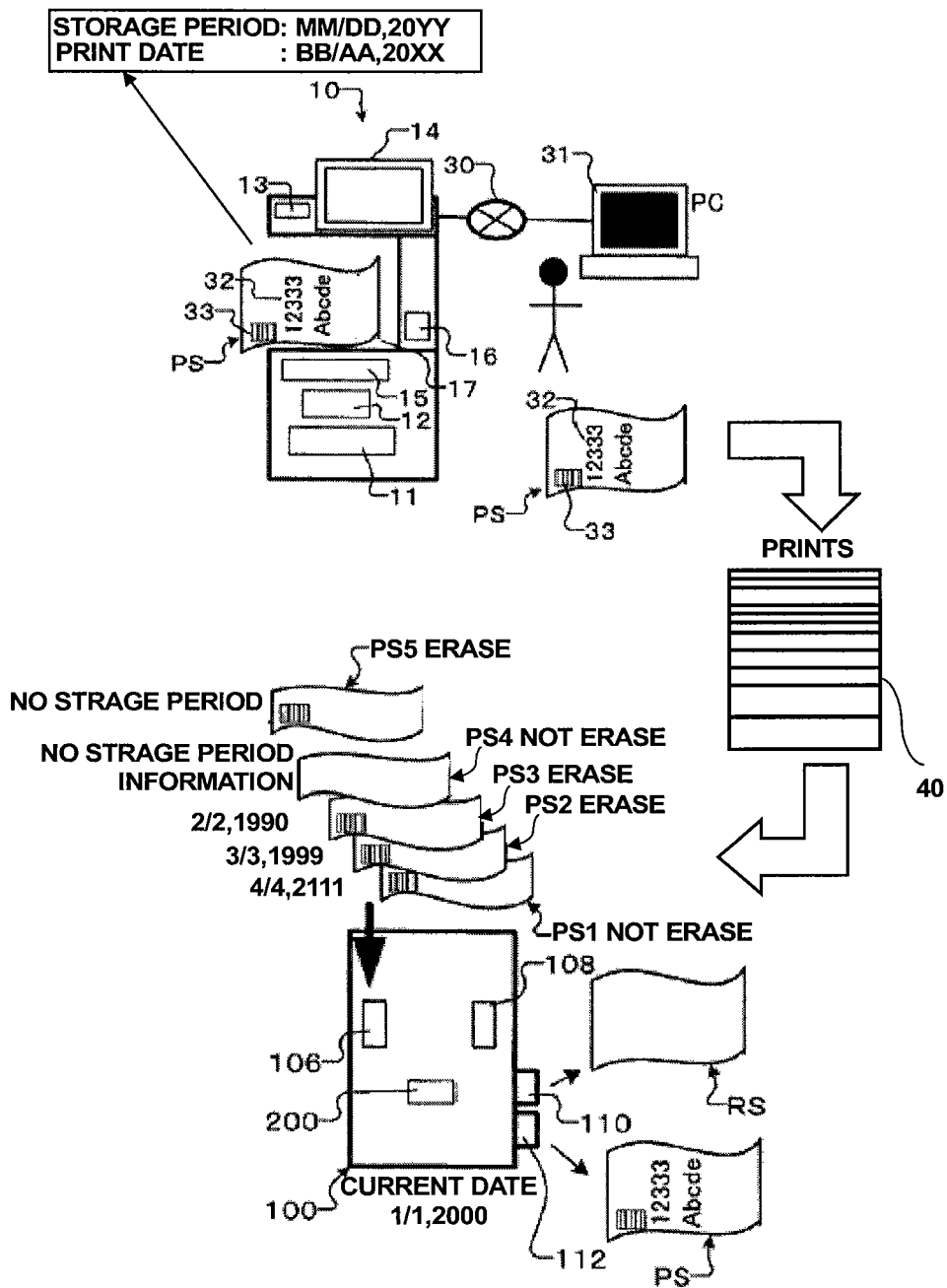
FIG. 1 is a diagram illustrating the flow of image erasing of an image erasing apparatus according to an embodiment.

According to an embodiment, there is provided an image erasing apparatus that determines whether or not to erase an erasable image printed on the recording medium. The image erasing apparatus includes an erasing unit, a reading unit, and a control unit. The erasing unit erases an image formed on the recording medium. The reading unit reads control information included in the image by scanning the recording medium before the image is erased by the erasing unit. The control unit determines whether or not to erase an image using the erasing unit on the basis of date information included in the control information read by the reading unit.

Hereinafter, further embodiments will be described with reference to drawings. In the drawings, the same reference numerals indicate the same or similar portions.

An embodiment will be described with reference to FIG. 1. FIG. 1 is a schematic diagram illustrating an embodiment of the flow from printing on a sheet by an image forming apparatus to image erasing by the image erasing apparatus.

As illustrated in FIG. 1, an image forming apparatus 10 is formed using a multi-function peripheral, for example. The image forming apparatus 10 forms an image on a recording medium, for example, on a sheet S, using an erasable color material, such as erasable toner or erasable ink.

The image forming apparatus 10 includes a paper cassette 11. New sheets or recycling sheets after image erasing are housed in the paper cassette 11. The image forming apparatus 10 forms an image on a sheet housed in the paper cassette. In the embodiment, a case where the image forming apparatus 10 forms an image on the recycling sheet (hereinafter, referred to as a sheet RS) will be described. The image forming apparatus 10 further includes a control unit 12, an operation unit 13, a display unit 14, an image forming process unit 15, a fixing unit 16, and a paper discharge unit 17. The image forming apparatus 10 is connected to a personal computer 31 (hereinafter, referred to as a PC 31) through a network 30. The image forming apparatus 10 receives print data transmitted from the PC 31. The print data transmitted from the PC 31 includes document information 32 and control information 33. Accordingly, an image printed on the sheet RS by the image forming apparatus 10 includes the document information 32 and the control information 33. The control information 33 includes the date information, a user code to identify a user who prints the document information, and the like. An image erasing apparatus 100, which will be described later, determines whether or not to erase the image printed on the sheet RS on the basis of the date information. Specifically, the date information includes print date information and date information of a storage period. The print date information is the date on which the image is printed by the image forming apparatus 10. The date information of the storage period is the date information regarding a period during which erasing processing of the image erasing apparatus 100 to be described later is prohibited. As will be described later, the date information of the storage period is specified in advance by the user. The image forming apparatus 10 prints the control information 33 at a predetermined position of the sheet RS, for example, using a barcode. For example, the predetermined position is a position outside a range where an image corresponding to the document information 32 is printed. As the barcode, for example, a two-dimensional barcode may be used. In addition to the barcode, for example, characters or a background pattern may also be adopted as a printing form of the control information 33. The printing form of the control information 33 is determined according to the specifications of an image erasing apparatus to be described later. In addition, the image forming apparatus 10 includes a user authentication unit. When accessing the image forming apparatus 10, the user inputs a user code to the image forming apparatus 10 by operating the operation unit 13. The user authentication unit performs the recognition of the user on the basis of the input user code. The image forming apparatus 10 allows the access of the user recognized by the user authentication unit.

The image forming process unit 15 forms an image of an erasable color material, for example, erasable toner on the sheet RS on the basis of the print data. The fixing unit 16 fixes the unfixed image of erasable toner to the sheet RS. By the fixing, printing of the image onto the sheet RS is completed. The paper discharge unit 17 receives the printed sheet RS discharged to the outside of the image forming apparatus 10 (hereinafter, the printed sheet is referred to as a sheet PS). An image including the document information 32 and the control information 33 is printed on the discharged sheet PS.

Figure 2:
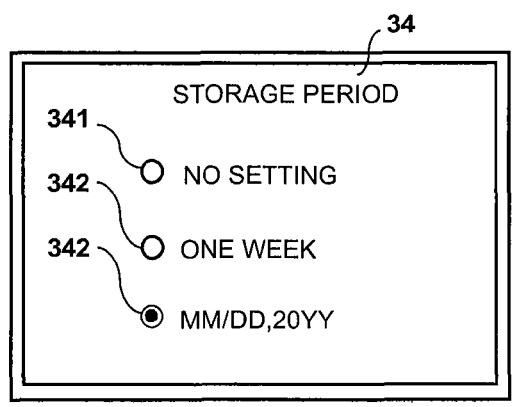
FIG. 2 is a diagram illustrating the display screen of a display unit that is used in a personal computer and the image forming apparatus used in the embodiment.

The PC 31 transmits the print data to the image forming apparatus 10. The PC 31 includes a keyboard and a display. The display displays a storage period setting screen 34 for specifying the date information of the storage period that is the control information 33. FIG. 2 is a diagram illustrating an embodiment of the storage period setting screen 34. As illustrated in FIG. 2, the storage period setting screen 34 includes a first setting portion 341 selected when the user specifies that the date of the storage period is not specified. For example, the characters "no setting" are displayed in the first setting portion 341. The storage period setting screen 34 includes a second setting portion 342 selected when the user specifies that the date of the storage period is one week from the print date, for example. For example, the characters "one week" are displayed in the second setting portion 342. In addition, the storage period setting screen 34 includes a third setting portion 343 selected when the user specifies that the date of the storage period can be arbitrarily input. When the user specifies the first setting portion 341, the control information 33 including the date information of a storage period, which means "no storage period", is printed on the sheet PS. When the user specifies the second setting portion 342, the control information 33 including the date information of one week after the print date is printed on the sheet PS as the date information of a storage period. When the user specifies the third setting portion 343, the control information 33 including the date information, which is input by the user operating the keyboard, is printed on the sheet PS as the date information of a storage period. FIG. 2 illustrates that the date information input as a date of a storage period by the user is "MM/DD, 20YY" (month/day, year). In addition, the image forming apparatus 10 has a copy function. The image forming apparatus 10 reads a document using a scanner (not illustrated) and prints an image on the sheet RS on the basis of the print data obtained by adding the control information 33 to the document information 32 acquired as a result of the reading. When printing an image using a copy function, the image forming apparatus 10 displays the storage period setting screen 34 on the display unit 14. The user can specify the date information of the storage period, which is the control information 33, using the operation unit 13 of the image forming apparatus 10 and the storage period setting screen 34 displayed on the display unit 14.

The printed sheet PS discharged to the paper discharge unit 17 of the image forming apparatus 10 is collected by the user. When the sheet PS is no longer needed, for example, when the user has finished reading the printed content of the sheet PS, the user stacks the sheet PS in an erasing sheet stacking unit 40 as a print to be erased. For example, when the sheet PS is accumulated in the stacking unit 40, the user takes out the sheet PS from the stacking unit 40 and sets the sheet PS in a paper feed tray 102 of the image erasing apparatus 100.

The image erasing apparatus 100 includes a control unit 200, a reading unit 106, and an erasing unit 108. The reading unit 106 reads the printed control information 33 by scanning the sheet PS before erasing processing is performed by the erasing unit 108. The control unit 200 determines whether or not to perform erasing on the basis of the date information included in the control information 33 read by the reading unit 106 (hereinafter, simply referred to as erase determination). The erase determination has a first period mode in which whether or not to erase the image on the sheet PS is determined on the basis of whether or not the current date information is included in the date information of a storage period. The current date is a date when performing erasing processing. Specifically, in the first period mode, the control unit 200 determines that the image on the sheet PS is erasable when the current date is not included in the date of the storage period. More specifically, the control unit 200 determines that the image on the sheet PS is erasable when the current date has passed the date of the storage period. The erase determination has a second period mode in which whether or not to erase the image on the sheet PS is determined on the basis of whether or not the print date is included in the information of a predetermined date range specified by the user. The predetermined date range is a date specified by the user in order to set the sheet PS having specific print date information as an object to be erased. Hereinafter, the predetermined date range is referred to as an erase date range. The information of the erase date specified by the user may be a specific date or may be a specific date range. Specifically, in the second period mode, the control unit 200 determines that the image on the sheet PS is erasable when the print date is included in the specified erase date range. More specifically, when the print date is within the specified erase date range, the control unit 200 determines that the image on the sheet PS is erasable. The erase date range specified by the user may be the range of a specific date. For example, the erase date range may be set in the form of "1/2, 2013 (month/day, year) to 3/4, 2013 (month/day, year)" or may be set in the form of "before a specific date" or "after a specific date". Specification of the first and second period modes will be described later.

The image erasing apparatus 100 includes a user authentication unit 224. The user authentication unit 224 determines whether or not the user who tries to access the image erasing apparatus 100 has a user code that matches a user code included in the control information 33 of the sheet PS on which an image is to be erased. When a result of the determination is a mismatch, the image erasing apparatus 100 discharges the sheet PS to a second tray 112 without performing erasing processing.

When the user specifies the first period mode, the erasing unit 108 performs processing of erasing the image on the sheet PS if the current date has passed the date of the storage period. After the erasing processing, the reading unit 106 reads the image by scanning the sheet PS again. The control unit 200 determines whether or not there is a remaining image after erasing on the basis of the information read by the reading unit 106. When there is no remaining image after erasing, the image erasing apparatus 100 discharges the sheet PS to a first tray 110. When there is a remaining image after erasing, the image erasing apparatus 100 discharges the sheet PS to the second tray 112.

When the control information 33 is not printed on the sheet PS, the image on the sheet PS is not erased in the present embodiment. In other words, the image erasing apparatus 100 not only determines whether or not to erase an image on the basis of the date information included in the control information, but also determines whether or not to erase an image using the erasing unit depending on whether or not the control information 33 is included in the image. In addition, it is also possible to specify whether or not to erase the image on the sheet PS when the control information 33 is not printed on the sheet PS.

On the other hand, when the control unit 200 determines that the current date has not passed the date of the storage period, the image erasing apparatus 100 discharges the sheet PS to the second tray 112 without performing erasing processing using the erasing unit 108.

In addition, when the user selects the second period mode, the erasing unit 108 erases the image on the sheet PS whose print date is included in the specified erase date range. When the print date is not included in the specified erase date range, the image erasing apparatus 100 discharges the sheet PS to the second tray 112 without performing erasing processing using the erasing unit 108. In addition to the first and second trays 110 and 112, the image erasing apparatus 100 may further include a third tray to which the sheet PS when the user codes do not match each other, the sheet PS within the storage period, and the sheet PS whose print date is out of the specified date range are discharged.

Hereinafter, the image erasing apparatus 100 will be described in more detail with reference to FIG. 3.

Figure 3:
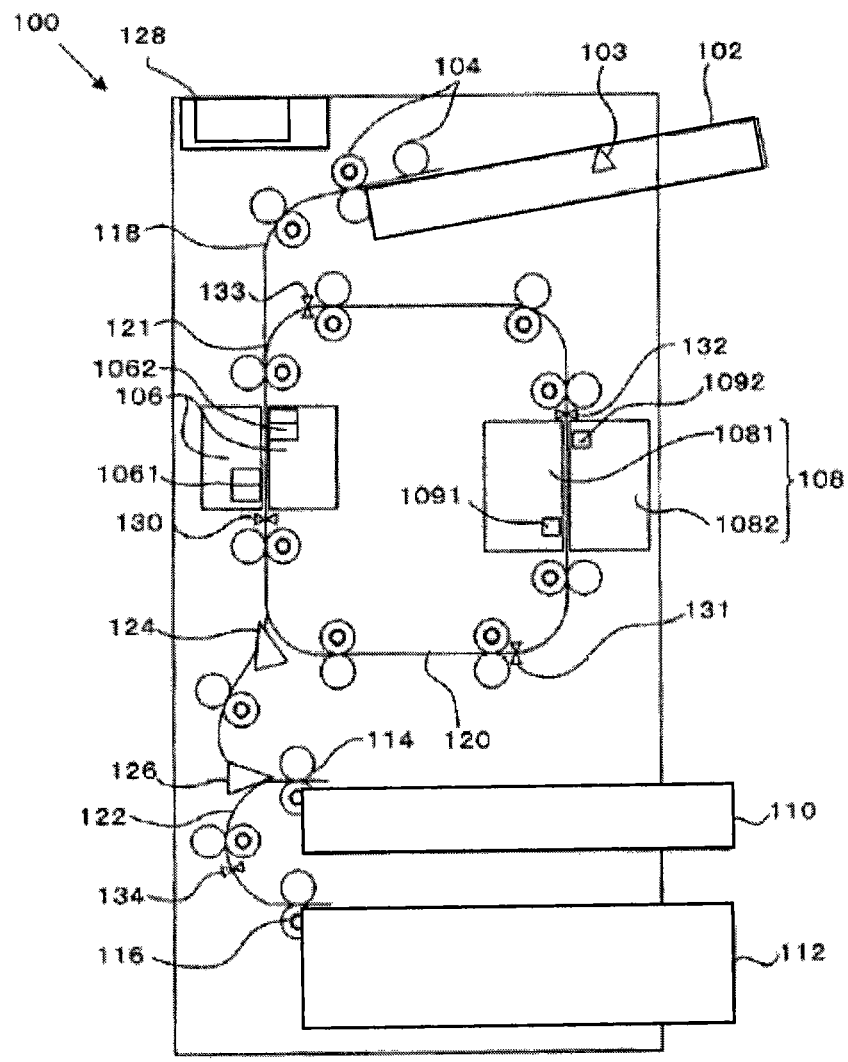
FIG. 3 is a cross-sectional view illustrating the image erasing apparatus according to the embodiment.

FIG. 3 is a cross-sectional view illustrating the configuration of the image erasing apparatus 100. As illustrated in FIG. 3, for the sheet PS on which an image is formed using an erasable color material, such as erasable toner or erasable ink, the image erasing apparatus 100 performs erasing processing for erasing the color of the image based on the erasable color material or making the color of the image transparent. Examples of the erasable color material include a coloring compound, color developer, and a decoloring agent. As the coloring compound, for example, leuco dyes can be mentioned. As the color developer, for example, phenols can be mentioned. As the decoloring agent, a material that is compatible with a coloring compound when heated and has no affinity with color developer can be mentioned. An erasable color material produces color by an interaction between the coloring compound and the color developer, and is decolored when the interaction between the coloring compound and the color developer disappears due to heating up to the decoloring temperature or higher. Hereinafter, the erasable color material is simply referred to as a recording material.

The image erasing apparatus 100 includes the paper feed tray 102, a paper feed member 104, the reading unit 106, the erasing unit 108, the first tray 110, the second tray 112, a discharge members 114 and 116, a first transport path 118, a second transport path 120, a third transport path 122, a first branch member 124, a second branch member 126, and an operation unit 128. In addition, the image erasing apparatus 100 includes the user authentication unit 224 for recognizing a user. Examples of the user authentication unit 224 include a face recognition unit that recognizes a user's face, a biometric authentication unit that recognizes biological characteristics, such as a finger or palm of the user, or a card reader using identification information included in an ID card or the like.

The sheet PS for reuse is stacked on the paper feed tray 102. The sheets PS of various sizes, such as A4, A3, and B5, are stacked on the paper feed tray 102. The sheet PS stacked on the paper feed tray 102 is, for example, a sheet on which an image is printed using a recording material whose color is erased or becomes transparent when heated up to a predetermined temperature or higher. The paper feed member 104 includes a pickup roller, a sheet supply roller, and a separation roller disposed opposite the sheet supply roller. The paper feed member 104 supplies the sheet PS one by one from the sheet PS at the uppermost position stacked on the paper feed tray 102 to the first transport path 118 inside the image erasing apparatus 100.

The paper feed tray 102 includes a detection sensor 103 that detects the presence or absence of a sheet on the paper feed tray 102 (hereinafter, referred to as a paper feed start detection sensor 103). The paper feed start detection sensor 103 can be formed using a micro-sensor or a micro-actuator, for example. When the paper feed start detection sensor 103 detects the loading of the sheet PS, the paper feed member 104 feeds the stacked sheet according to the set paper feed mode. Paper feed control of the control unit 200 will be described later.

The first transport path 118 forms a transport path from the paper feed tray 102 toward the first tray 110. The first transport path 118 is for transporting a fed sheet to the reading unit 106 or the first tray 110.

The reading unit 106 is disposed at a position on the downstream side of the paper feed tray 102 in the sheet transport direction and along the first transport path 118. For example, the reading unit 106 includes a charge coupled device (CCD) scanner, a CMOS sensor, and the like. The reading unit 106 reads an image of each surface by scanning the first and second surfaces of the transported sheet. The reading unit 106 includes first and second reading units 1061 and 1062 disposed along the first transport path 118 with the first transport path 118 interposed therebetween. Therefore, it is possible to read images of both surfaces by scanning both surfaces of a sheet, which is being transported, simultaneously using the first and second reading units 1061 and 1062. The position where the reading unit 106 reads the image on the sheet is referred to as a reading position. The data of the image read by the reading unit 106 is stored in a storage unit 210 to be described later. For example, before erasing processing, an image on the sheet read by the reading unit 106 is stored in the storage unit 210 in an electronic form. After image erasing, it is possible to acquire the data of the stored image when the user needs the data of the erased image. Since a plurality of sheets stacked on the paper feed tray 102 are fed in order from the uppermost sheet by the paper feed member 104, it is difficult for the user to add a sheet during the paper feed. Accordingly, the image erasing apparatus 100 performs erasing processing with a plurality of sheets, which are once stacked on the paper feed tray 102, as one unit of erasing processing.

The control unit 200, which will be described later, performs erase determination on the basis of the date information included in the control information 33 read by the reading unit 106. In addition, the control unit 200 determines whether or not the corresponding sheet is a sheet having an erasable printed image or whether or not the corresponding sheet is a reusable sheet.

At a position on the downstream side of the reading unit 106 in the sheet transport direction, the first branch member 124 is disposed as a unit to change the sheet transport direction. The first branch member 124 changes the transport direction of the sheet being transported. The first branch member 124 is for transporting the sheet, which has been transported along the first transport path 118, along the second transport path 120 or to the first tray 110. The second transport path 120 branches from the first transport path 118 at the branch point where the first branch member 124 is disposed. The sheet PS is transported to the erasing unit 108 along the second transport path 120 that branches from the branch point. In addition, the second transport path 120 joins the first transport path 118 at a junction 121 that is located on the upstream side of the reading unit 106 in the sheet transport direction and on the downstream side of the paper feed tray 102 in the sheet transport direction. Therefore, the second transport path 120 transports the sheet PS that has been transported from the reading unit 106 again to the reading unit 106 through the erasing unit 108. In other words, the image erasing apparatus 100 transports the sheet PS fed from the paper feed member 104 to the reading unit 106, the erasing unit 108, and the reading unit 106 in this order by controlling the first branch member 124.

The first transport path 118 includes the second branch member 126 located on the downstream side of the first branch member 124 in the sheet transport direction. The second branch member 126 guides the sheet PS, which has been transported from the first branch member 124, to the first tray 110 or the third transport path 122. The third transport path 122 is for transporting the sheet PS to the second tray 112.

The erasing unit 108 erases the color of the image on the transported sheet PS. For example, the erasing unit 108 heats the image on the sheet PS up to a predetermined erasing temperature in a state of being in contact with the transported sheet PS. The erasing unit 108 erases the color of a recording material, which forms the image, by heating the image on the sheet PS. The erasing unit 108 includes two erasing units 1081 and 1082 for erasing first and second surfaces of the sheet PS. The erasing units 1081 and 1082 are disposed opposite each other with the second transport path 120 interposed therebetween. The erasing unit 1081 comes in contact with the sheet PS from one surface side of the sheet PS to heat the image on the sheet PS. The erasing unit 1082 comes in contact with the sheet PS from the other surface side of the sheet PS to heat the image on the sheet PS. The erasing unit 108 erases the images on both the surfaces of the transported sheet PS during one transport. The position where the sheet PS is heated by the erasing units 1081 and 1082, in other words, the position where heating sections (not illustrated) of the erasing units 1081 and 1082 give heat to the images of the transported sheet PS to erase the color of the images is referred to as an erasing position. The erasing unit 108 includes temperature sensors 1091 and 1092 that detect the temperature of the heating sections of the erasing units 1081 and 1082. The temperature sensors 1091 and 1092 may be contact type sensors or may be non-contact type sensors.

The operation unit 128 includes a touch panel type display unit 1281 and various operation keys and is disposed, for example, in an upper portion of the main body of the image erasing apparatus 100. The operation keys include a ten key, a stop key, a start key, and the like, for example.

Figure 4A:
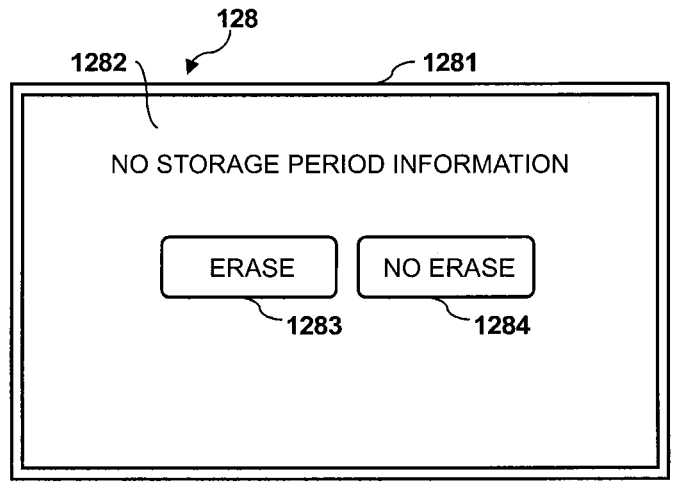
FIGS. 4A and 4B are diagrams illustrating the display screen displayed on the display unit used in the image erasing apparatus according to the embodiment.
Figure 4B:
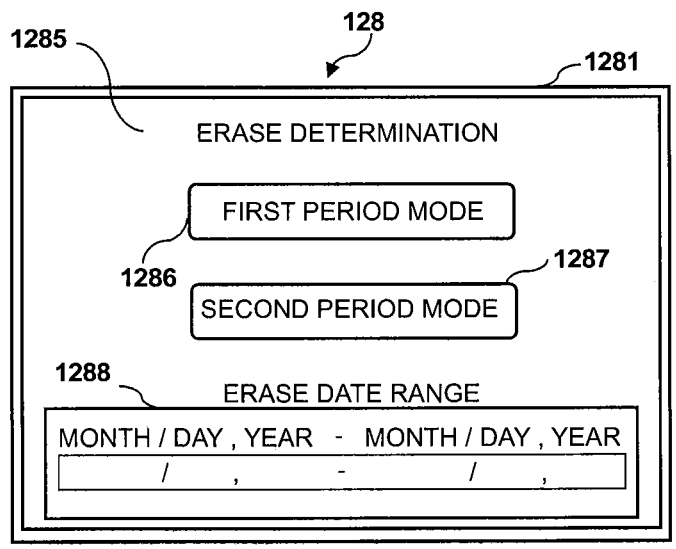

The image erasing apparatus 100 feeds the sheet PS stacked on the paper feed tray 102 according to the set paper feed mode to be described later. FIGS. 4A and 4B are diagrams illustrating the display screen of the display unit 1281. As illustrated in FIG. 4A, a user can specify whether or not to erase an image when the control information 33 is not printed on the sheet PS. When the operation unit 128 receives an operation of the user for this specification, the display unit 1281 displays an erase setting screen 1282 for setting whether or not to perform erasing when the control information 33 is not printed. The erase setting screen 1282 displays the characters "no storage period information" at an upper position in FIG. 4A. The erase setting screen 1282 includes first and second switch portions 1283 and 1284. The first switch portion 1283 receives an operation of the user, who specifies the erasing of the image, even if the control information 33 is not printed on the sheet PS. The characters "erase" are displayed in the first switch portion 1283. The second switch portion 1284 receives an operation of the user, who specifies no erasing of the image, if the control information 33 is not printed on the sheet PS. The characters "no erase" are displayed in the second switch portion 1284. Therefore, the user can select "erase" by selecting the first switch portion 1283 displayed on the erase setting screen. In addition, the user can select "no erase" by selecting the second switch portion 1284.

When specifying the first period mode or the second period mode as an erase determination mode, the user operates the operation unit 128. When the operation unit 128 receives the operation of the user, the display unit 1281 displays an erase determination setting screen 1285. FIG. 4B illustrates the erase determination setting screen 1285. As shown in FIG. 4B, the erase determination setting screen 1285 includes first and second period mode selection portions 1286 and 1287. The erase determination setting screen 1285 displays the characters "erase determination" at the upper position in FIG. 4B. The first period mode selection portion 1286 receives an operation of the user who specifies the first period mode as an erase determination mode. The characters "first period mode" are displayed in the first period mode selection portion 1286. The second period mode selection portion 1287 receives an operation of the user who specifies the second period mode as an erase determination mode. The characters "second period mode" are displayed in the second period mode selection portion 1287. Therefore, the user can set one of the first and second period modes by selecting the first period mode selection portion 1286 or the second period mode selection portion 1287. The erase determination setting screen 1285 further includes a range setting portion 1288. The characters "erase date range" are displayed in the range setting portion 1288 at the lower position in FIG. 4B. The range setting portion 1288 displays a date indicating the date range specified in the second period mode.

The operation unit 128 receives not only the above-described paper feed mode setting operation but also an operation of the user to specify the functional operation of the image erasing apparatus 100 such as erase start or reading of a sheet image to be erased. In addition, the operation unit 128 displays the set information or operational status of the image erasing apparatus 100, log information, or messages to the user.

The operation unit 128 does not necessarily need to be disposed in the main body of the image erasing apparatus 100. For example, the operation unit 128 may be an operation unit of an external device that is connected to the image erasing apparatus 100 through a network so as to operate the image erasing apparatus 100. Alternatively, the operation unit 128 may be provided in a form independent of the main body of the image erasing apparatus 100, or may be configured to operate the image erasing apparatus 100 by wired or wireless communication. Preferably, it is possible to give an instruction of processing to the image erasing apparatus 100 and to view the information using the operation unit 128 of the present embodiment.

The discharge members 114 and 116 discharge a sheet to the first and second trays 110 and 112 disposed up and down in the lower portion of the main body. For example, the recycling sheet RS that has become reusable by erasing the image on the sheet PS is stacked on the first tray 110.

On the second tray 112, as described above, the sheet PS determined that the current date is within the date range of the storage period is stacked. The sheet PS determined not to be reusable is further stacked on the second tray 112. Hereinafter, the first tray 110 is referred to as a reuse tray, and the second tray 112 is referred to as a reject tray. Target sheets to be received by the reuse tray 110 and the reject tray 112 can also be exchanged. For example, by making the operation unit 128 receive an operation of the user, it is possible to specify on which tray what kind of sheet is to be stacked, in other words, it is possible to specify a place to which a sheet is to be discharged. By this specification, the second branch member 126 changes the transport path to guide the sheet, which is being transported, to the first tray 110 or the third transport path 122.

The image erasing apparatus 100 includes a plurality of sheet detection sensors 130 to 134 that detect a sheet transported along the first to third transport paths 118, 120, and 122. The sheet detection sensors 130 to 134 can be formed using a micro-sensor or a micro-actuator, for example. The sheet detection sensors 130 to 134 can be disposed at the appropriate positions of the transport path.

Figure 5:
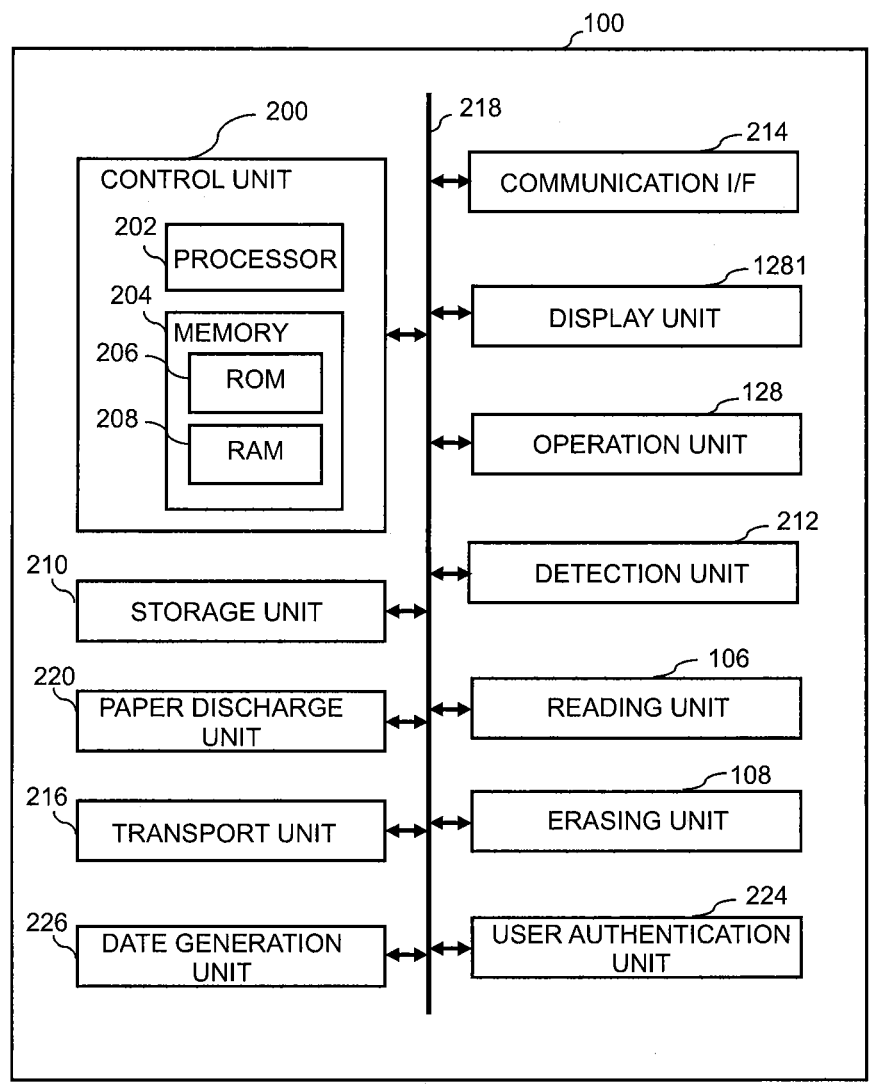
FIG. 5 is a block diagram illustrating the hardware configuration of the image erasing apparatus according to the embodiment.

FIG. 5 is a block diagram illustrating the hardware configuration of the image erasing apparatus 100. As shown in FIG. 5, the image erasing apparatus 100 includes: the control unit 200; the storage unit 210; a detection unit 212 including the paper feed start detection sensor 103, the sheet detection sensors 130 to 134, and the temperature sensors 1091 and 1092; a communication interface (communication I/F) 214; a transport unit 216 including the paper feed member 104; the reading unit 106; the erasing unit 108; the operation unit 128; the display unit 1281; a paper discharge unit 220; the user authentication unit 224; and a date generation unit 226 that generates a current date and time. In other words, the current date and time is a date and time at the time of erasing.

The control unit (controller) 200 includes a processor 202, such as a central processing unit (CPU) or a micro processing unit (MPU), and a memory 204. The control unit 200 controls the reading unit 106, the erasing unit 108, the operation unit 128, the display unit 1281, the transport unit 216, and the paper discharge unit 220.

The memory 204 is, for example, a semiconductor memory, and includes a read only memory (ROM) 206 that stores various control programs and a random access memory (RAM) 208 for providing a temporary working area for the processor 202. For example, the ROM 206 stores a printing rate of a sheet that is a threshold value for reusability determination, a density threshold value for determining whether or not the color of an image has been erased, and the like. The RAM 208 stores the information of the date range specified by the user and received by the operation unit 128. In addition, the RAM 208 may temporarily store the data of the image read by the reading unit 106. The respective components of the image erasing apparatus 100 are connected to each other through a bus 218.

For example, the image erasing apparatus 100 performs erase determination processing, paper feed processing, reading processing, erasing processing, sorting processing, and pre-sorting processing. The control unit 200 controls the transport unit 216, the reading unit 106, the erasing unit 108, and other components according to the processing selected by the operation of the user received by the operation unit 128. The paper feed processing will be described later.

In the reading processing, the control unit 200 stores the document information 32 and the control information 33, which are included in the data of the image read by the reading unit 106, in the storage unit 210.

In the erase determination processing, when the first period mode is specified by the user, the control unit 200 compares the current date generated by the date generation unit 226 with the date of the storage period included in the control information 33. When a result of the comparison is that the current date (date at the time of erasing) has passed the date of the storage period, the control unit 200 determines that the image is erasable. The control unit 200 allows the erasing processing of the erasing unit. When a result of the comparison is that the current date has not passed the date of the storage period, the control unit 200 determines that the image is not erasable. The control unit 200 does not allow the erasing processing of the erasing unit 108. Accordingly, the image erasing apparatus 100 does not perform erasing processing. In addition, the control unit 200 controls the first and second branch members 124 and 126 to set the transport direction of the printed sheet PS so that the sheet PS is transported from the first transport path 118 to the third transport path 122 and is stacked on the reject tray 112.

In FIG. 1, on the first sheet PS1 from the bottom, the date of "4/4, 2111" (month/day, year) is printed as the date of the storage period. On the second sheet PS2 from the bottom, the date of "3/3, 1999" (month/day, year) is printed as the date of the storage period. On the third sheet PS3 from the bottom, the date of "2/2, 1990" (month/day, year) is printed as the date of the storage period. For example, when the date at the time of erasing is set to 1/1, 2000 (month/day, year), the control unit 200 determines that the image on the sheet PS1 is not erasable. The control unit 200 determines that the image on the sheet PS2 is erasable. The control unit 200 determines that the image on the sheet PS3 is erasable.

In addition, in FIG. 1, the control information 33 is not printed on the fourth sheet PS4 from the bottom (no storage period information). For example, when the user specifies "no erase when the control information 33 is not printed" by selecting the second switch portion 1284 in advance on the erase setting screen 1282, the control unit 200 determines that the image on the sheet PS4 is not erasable. In addition, in FIG. 1, on the top sheet PS5, control information "no storage period" is printed as the date information of the storage period. The control unit 200 recognizes the control information "no storage period" of the sheet PS, and determines that the image on the sheet PS5 is erasable.

In the erase determination processing, when the second period mode is specified by the user, the operation unit 128 receives an operation of the user who specifies the date indicating the date range. The display unit 1281 displays the specified date, which indicates the date range, in the range setting portion 1288 of the erase determination setting screen 1285. The control unit 200 compares the erase date range with the print date included in the control information 33. When a result of the comparison is that the print date is included in the erase date range, the control unit 200 determines that the image is erasable. The control unit 200 allows the erasing processing of the erasing unit. When a result of the comparison is that the print date is not included in the erase date range, the control unit 200 determines that the image is not erasable. The control unit 200 does not allow the erasing processing of the erasing unit. Accordingly, the image erasing apparatus 100 does not perform erasing processing. Specifically, the control unit 200 controls the first and second branch members 124 and 126 to set the transport direction of the sheet PS so that the sheet PS is transported from the first transport path 118 to the third transport path 122 and is stacked on the reject tray 112.

Figure 6:
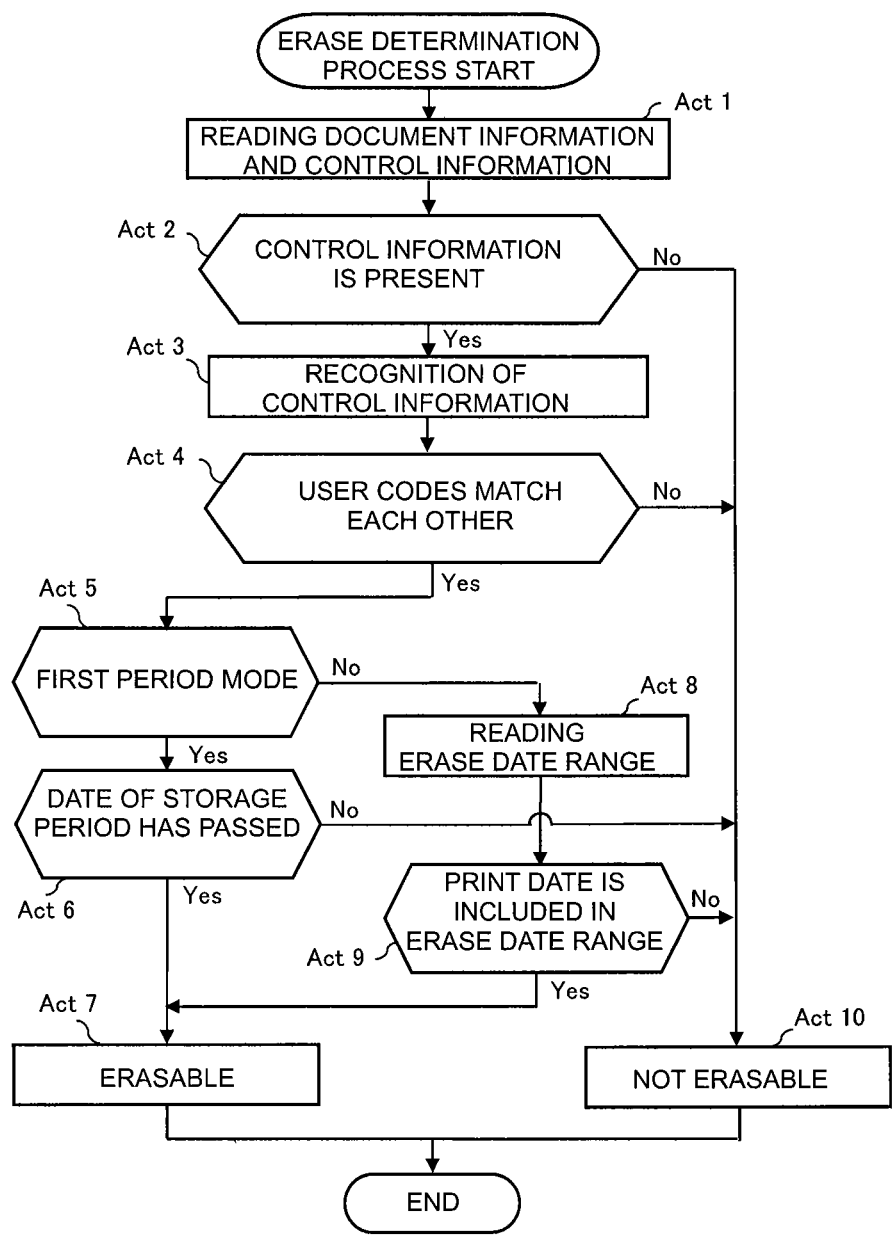
FIG. 6 is a flowchart illustrating the flow of erase determination processing of the image erasing apparatus according to the embodiment.

FIG. 6 is a flowchart illustrating the flow of erase determination processing. In the following erase determination processing, it is assumed that the user has already selected the second switch portion 1284 to specify "no erase when the control information 33 is not printed".

In Act 1, the reading unit 106 reads the document information 32 and the control information 33 by scanning the printed sheet PS. After the reading, the operation of the image erasing apparatus 100 proceeds to Act 2.

In Act 2, the control unit 200 determines whether or not the control information 33 is present on the basis of the information read by the reading unit 106. When the control unit 200 determines that the control information 33 is present, the operation of the image erasing apparatus 100 proceeds to Act 3. When the control unit 200 determines that there is no control information 33, the operation of the image erasing apparatus 100 proceeds to Act 10. In Act 10, the control unit 200 determines that the image on the sheet PS is not erasable. When the control unit 200 determines that the image on the sheet PS is not erasable, the erasing unit 108 does not perform erasing processing.

In Act 3, the user authentication unit 224 recognizes the control information 33 printed on the sheet PS. In Act 4, the user authentication unit 224 determines whether or not the user code that the user has input using the operation unit 128 matches the user code included in the control information 33. When the user authentication unit 224 determines that the user codes match each other, the operation of the image erasing apparatus 100 proceeds to Act 5. When the user authentication unit 224 determines that the user codes do not match each other, the operation of the image erasing apparatus 100 proceeds to Act 10. In Act 10, the control unit 200 determines that the image on the sheet PS is not erasable. When the control unit 200 determines that the image on the sheet PS is not erasable, the erasing unit 108 does not perform erasing processing. In the erase determination processing, it is also possible to omit the authentication processing.

In Act 5, the control unit 200 determines whether or not the erase determination mode is the first period mode. When the control unit 200 determines that the erase determination mode is the first period mode, the operation of the image erasing apparatus 100 proceeds to Act 6. When the control unit 200 determines that the erase determination mode is not the first period mode but the second period mode, the operation of the image erasing apparatus 100 proceeds to Act 8.

In Act 6, the control unit 200 determines whether or not the current date has passed the date of the storage period included in the control information 33. When the control unit 200 determines that the current date has passed the date of the storage period, the operation of the image erasing apparatus 100 proceeds to Act 7. When the control unit 200 determines that the current date has not passed the date of the storage period, the operation of the image erasing apparatus 100 proceeds to Act 10. In Act 10, the control unit 200 determines that the image on the sheet PS is not erasable. When the control unit 200 determines that the image on the sheet PS is not erasable, the erasing unit 108 does not perform erasing processing.

In Act 7, the control unit 200 determines that the image on the sheet PS is erasable. The image erasing apparatus 100 transports the sheet PS to the erasing unit 108 to perform erasing processing.

On the other hand, when the control unit 200 determines that the erase determination mode is not the first period mode but the second period mode in Act 5, the control unit 200 reads the erase date range, which is specified by the user and is displayed in the range setting portion 1288, from the RAM 208 in Act 8. After the reading, the operation of the image erasing apparatus 100 proceeds to Act 9.

In Act 9, the control unit 200 determines whether or not the print date included in the control information 33 is included in the erase date range. When the control unit 200 determines that the print date is included in the erase date range, the operation of the image erasing apparatus 100 proceeds to Act 7. In Act 7, the control unit 200 determines that the image on the sheet PS is erasable. When the control unit 200 determines that the print date is out of the erase date range, the operation of the image erasing apparatus 100 proceeds to Act 10. In Act 10 (determination of "not erasable"), the control unit 200 determines that the image on the sheet PS is not erasable.

In Act 7, the image on the sheet PS determined to be erasable is erased by the erasing unit 108. The control unit 200 determines whether or not the sheet RS after erasing processing is reusable on the basis of the information read by the reading unit 106. For example, in sorting processing, the control unit 200 determines whether or not there is a remaining image on the sheet RS after erasing on the basis of the information read by the reading unit 106. As a result of the determination, when the control unit 200 determines that there is a remaining image after erasing, the control unit 200 determines that the sheet RS is not reusable. For example, when there is a remaining image after erasing, the control unit 200 recognizes that there is a remaining image on the sheet RS after erasing on the basis of the information read by the reading unit 106, and determines that the sheet RS is not reusable. In addition, in the sorting processing, the control unit 200 determines the depth of wrinkles of the sheet or the presence or absence of folding and breaking on the basis of the information read by the reading unit 106. When the depth of wrinkles of the sheet is equal to or greater than the defined value or when there is folding, breaking, or a hole, the image erasing apparatus 100 determined that the sheet is not reusable.

In pre-sorting processing, the control unit 200 determines the printing rate of the image on the sheet on the basis of the information read by the reading unit 106 before erasing processing. When the printing rate is equal to or greater than a predetermined value, the image erasing apparatus 100 discharges the sheet PS as a sheet that is not reusable without executing erasing processing. Specifically, the control unit 200 discharges the sheet PS, which has been determined not to be reusable, to the reject tray 112 using the first and second branch members 124 and 126 and the like. In addition, the control unit 200 may determine whether or not data that should not be erased, such as confidential data, is included in the image on the sheet PS on the basis of the information read by the reading unit 106. When data that should not be erased is included in the image on the sheet PS, the control unit 200 discharges the sheet PS to the reject tray 112 using the first and second branch members 124 and 126 and the like.

Whether or not to execute reading processing using the reading unit 106 before erasing processing, whether or not to execute erasing processing using the erasing unit 108, whether or not to execute sorting processing, and whether or not to execute automatic paper feed processing can be arbitrarily selected.

Specifically, the selection of each processing is performed when the user specifies whether or not to execute each processing using the operation unit 128 of the image erasing apparatus 100. The selection of processing to be executed may be specified from an external terminal without being limited to the operation unit 128 of the image erasing apparatus 100. The user can select an appropriate combination of the erase determination processing, the paper feed processing, the reading processing, the erasing processing, the sorting processing, and the pre-sorting processing described above by specifying the above processes using the operation unit 128 or the like. In the image erasing apparatus 100 of the present embodiment, as an example of the execution order of the above-described processes when these processes are combined, the order of paper feed processing, reading processing, erase determination processing, erasing processing, and sorting processing has priority. In the execution order of the above-described processes, the priority of the execution order of the reading processing and the pre-sorting processing is equal.

For example, when the reading processing, the erasing processing, and the sorting processing are selected, the image erasing apparatus 100 executes the processes in order of the reading processing of the reading unit 106, the erasing processing of the erasing unit 108, and the sorting processing of the reading unit 106.

Specifically, the reading unit 106 reads the image on the sheet PS before the erasing unit 108 erases the image on the sheet PS, and the reading unit 106 reads the erased image on the sheet PS after the erasing unit 108 erases the image on the sheet PS.

When the pre-sorting processing, the erasing processing, and the sorting processing are selected, the image erasing apparatus 100 executes the processes in order of the pre-sorting processing of the reading unit 106, the erasing processing of the erasing unit 108, and the sorting processing of the reading unit 106.

When the reading processing and the pre-sorting processing are selected, the image erasing apparatus 100 executes the reading processing based on the data read by the reading unit 106 and the pre-sorting processing based on the printing rate simultaneously.

The image erasing apparatus 100 is not limited to the cases where the user appropriately selects the processes. For example, the image erasing apparatus 100 may have a plurality of processing modes whose combinations are determined in advance so that the user selects one of the plurality of processing modes. The control unit 200 of the image erasing apparatus 100 changes the transport path of the sheet appropriately on the basis of the selected processing mode.

The control unit 200 controls each component of the apparatus on the basis of a signal from the detection unit 212. The detection unit 212 includes the paper feed start detection sensor 103, the temperature sensors 1091 and 1092, and the sheet detection sensors 130 to 134 shown in FIG. 3. The control unit 200 determines whether or not there is a sheet on the paper feed tray 102 on the basis of a signal from the detection sensor 103. In addition, the control unit 200 detects the temperature of heating sections of the erasing units 1081 and 1082 using the temperature sensors 1091 and 1092, and controls the temperature of the heating sections of the erasing units 1081 and 1082. In addition, the control unit 200 checks the position of the sheet in the first to third transport paths 118, 120, and 122 using the sheet detection sensors 130 to 134. For example, the control unit 200 detects the sheet PS, which has passed the reading unit 106, using the sheet detection sensor 130 provided on the downstream side of the reading unit 106 and near the reading unit 106.

The storage unit 210 stores application programs and the operation system (OS). The application programs include a program to execute a reading function of the reading unit 106 and a function of the image erasing apparatus, such as an erasing function of the erasing unit. The application programs further include an application for Web clients (Web browser) and other applications. The storage unit 210 stores the data of the image read by the reading unit 106. The storage unit 210 stores the number of processed sheets that have been processed by the image erasing apparatus 100. As the storage unit 210, for example, a hard disk drive or other magnetic storage devices, an optical storage device, a semiconductor memory such as a flash memory, or any combination of these may be used.

The communication I/F 214 is an interface connected to an external device. The communication I/F 214 communicate with an external device on the network in a wired or wireless manner. The communication I/F 214 may further include a USB connecting portion to which a connection terminal of the USB standard is connected, a parallel interface, and the like. The control unit 200 communicates with a multi-function peripheral and other external devices through the communication I/F 214. For example, although the data of the image read by the reading unit 106 is stored in the storage unit 210 of the image erasing apparatus 100, the invention is not limited thereto. For example, by communication with a user terminal (for example, a personal computer), a multi-function peripheral or a server, which is an external device, through the communication I/F 214, the data of the image read by the reading unit 106 may be stored in storage units of these external devices. The image data stored in the external devices may be read from an operation unit of the multi-function peripheral or the user terminal.

When a user is specified by the user authentication unit 224 that performs personal authentication of a user, the control unit 200 sets the processing executed last on the basis of the usage history of the user. In addition, when the user authentication unit 224 has login and logout functions, it is possible to transmit the image data, which is stored in the RAM 208 or the storage unit 210 of the image erasing apparatus 100, to an external device and to store the image data at the time of logout of the image erasing apparatus 100.

The transport unit 216 includes a plurality of transport rollers including the paper feed member 104, disposed in the first to third transport paths 118, 120, and 122, and a transport motor that drives the transport rollers. The control unit 200 controls the transport speed of the sheet by controlling the driving of the transport motor of the transport unit 216.

In FIG. 1, the image forming apparatus 10 and the image erasing apparatus 100 have been described as separate apparatuses. However, a single image forming apparatus or image erasing apparatus with a mechanism having both functions of image formation and erasing may be used. As an example of the apparatus having both functions of image formation and erasing, a configuration may be illustrated which includes an image forming unit with an erasable color material, a paper feed unit to feed a sheet for printing to the image forming unit, a stacking unit on which the printed sheet PS, printed with the erasable color material, is stacked, and an erasing unit to erase an image on the printed sheet PS stacked on the stacking unit. In other words, an image erasing apparatus including an image reading unit may include an image forming unit that can print an image with an erasable color material. On the contrary, an image forming apparatus that forms an image with an erasable color material may include an image reading unit and an erasing unit that can erase the erasable color material.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image erasing apparatus, comprising:
   an erasing unit configured to erase an image formed on a recording medium;
   a reading unit configured to read control information included in the image by scanning the recording medium before erasing the image using the erasing unit; and
   a control unit configured to determine whether or not to erase the image using the erasing unit on the basis of date information included in the control information read by the reading unit.

2. The image erasing apparatus according to claim 1, wherein the date information included in the control information includes date information regarding a period, during which erasing of the erasing unit is prohibited, and information of a date when the image is formed on the recording medium.

3. The image erasing apparatus according to claim 2, wherein the determination of the control unit regarding whether or not to erase the image includes a first mode, in which determination is performed on the basis of the date information regarding the period during which erasing is prohibited, and a second mode, in which determination is performed on the basis of the information of the date when the image is formed on the recording medium.

4. The image erasing apparatus according to claim 3, further comprising:
   an operation unit for selecting one of the first and second modes,
   wherein the control unit determines whether or not to erase the image using the erasing unit in the mode selected by the operation unit.

5. The image erasing apparatus according to claim 4, wherein the operation unit includes a display unit that displays a display screen including a first mode selection portion for selection of the first mode and a second mode selection portion for selection of the second mode.

6. The image erasing apparatus according to claim 5, further comprising:
   a date generation unit that generates information of a current date,
   wherein, in the first mode, when the date information generated by the date generation unit is not included in the date information regarding the period during which erasing is prohibited, the control unit determines that the image is erasable by the erasing unit.

7. The image erasing apparatus according to claim 5, wherein, in the second mode, date range information is specified using the operation unit, and the control unit determines that the image is erasable by the erasing unit when the date information included in the control information is included in the date range information specified using the operation unit.

8. The image erasing apparatus according to claim 1, wherein the control unit determines whether or not to erase the image using the erasing unit depending on whether or not the control information is included in the image.

9. The image erasing apparatus according to claim 1, further comprising:
   a first paper discharge tray to which a recording medium after erasing an image using the erasing unit is discharged; and
   a second paper discharge tray to which a recording medium determined not to be erasable by the control unit is discharged.

10. The image erasing apparatus according to claim 1, further comprising:
    a paper feed tray on which a plurality of recording media are stacked; and
    a paper feed member that supplies the plurality of recording media stacked on the paper feed tray one by one continuously to the reading unit,
    wherein the control unit continuously determines whether or not to erase images on the plurality of recording media on the basis of the control information obtained by image reading of the reading unit.

* * * * *